United States Patent
Xiao

(10) Patent No.: US 8,360,394 B2
(45) Date of Patent: Jan. 29, 2013

(54) CONTROL SYSTEM AND METHOD FOR TRANSITIONING BETWEEN POSITION CONTROL AND FORCE CONTROL FOR MULTI-STAGE TURBO ENGINE TURBINE BYPASS VALVE

(75) Inventor: Yun Xiao, Ann Arbor, MI (US)

(73) Assignee: GM Global Technology Operations LLC

( * ) Notice: Subject to any disclaimer, the term of this patent is extended or adjusted under 35 U.S.C. 154(b) by 904 days.

(21) Appl. No.: 12/480,971

(22) Filed: Jun. 9, 2009

(65) Prior Publication Data

US 2010/0024418 A1    Feb. 4, 2010

Related U.S. Application Data

(60) Provisional application No. 61/084,816, filed on Jul. 30, 2008.

(51) Int. Cl.
 *F16K 31/02* (2006.01)
(52) U.S. Cl. .................................... 251/129.04

(58) Field of Classification Search ............ 251/129.04, 251/129.05; 700/282; 123/90.11
See application file for complete search history.

(56) References Cited

U.S. PATENT DOCUMENTS

| | | | | |
|---|---|---|---|---|
| 4,766,921 A * | 8/1988 | Williams | ................. | 251/129.05 |
| 5,551,480 A * | 9/1996 | Tomatsu et al. | .......... | 251/129.05 |
| 5,605,044 A * | 2/1997 | Zimmer et al. | ................. | 60/602 |
| 5,645,097 A * | 7/1997 | Zechmann et al. | ...... | 251/129.05 |
| 6,354,563 B1 * | 3/2002 | Yoeda et al. | ............ | 251/129.04 |
| 6,364,281 B1 * | 4/2002 | DeLand et al. | .......... | 251/129.04 |
| 6,560,088 B1 * | 5/2003 | Beck et al. | ................ | 251/129.01 |
| 6,616,121 B2 * | 9/2003 | Asakura et al. | .......... | 251/129.04 |
| 6,681,728 B2 * | 1/2004 | Haghgooie et al. | ........ | 123/90.11 |
| 6,820,631 B2 * | 11/2004 | Lehnst et al. | ............. | 251/129.04 |

* cited by examiner

*Primary Examiner* — Eric Keasel

(57) ABSTRACT

A control system comprising a current control module and a force control module. The current control module selectively supplies a current to a turbine bypass valve (TBV) to adjust the TBV to a predetermined position. The force control module selectively adjusts the current in response to a determination that an actual TBV position is less than a predetermined distance from the predetermined position.

16 Claims, 7 Drawing Sheets

CONTROL SYSTEM AND METHOD FOR TRANSITIONING BETWEEN POSITION CONTROL AND FORCE CONTROL FOR MULTI-STAGE TURBO ENGINE TURBINE BYPASS VALVE

CROSS-REFERENCE TO RELATED APPLICATIONS

This application claims the benefit of U.S. Provisional Application No. 61/084,816, filed on Jul. 30, 2008.

FIELD

The present disclosure relates to valve position control and more particularly to valve position control in an engine system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts an air/fuel mixture to produce drive torque for a vehicle. Opening of a throttle valve is regulated to control the amount of air drawn into an intake manifold. Air from the intake manifold is drawn into cylinders. A fuel system may inject fuel into the intake manifold or may inject fuel directly into the cylinders.

The byproducts of combustion are exhausted from the vehicle via an exhaust manifold. A high-pressure (HP) turbocharger and a low-pressure (LP) turbocharger are powered by exhaust gases flowing through the exhaust manifold and provide an HP compressed air charge and an LP compressed air charge, respectively, to the intake manifold. A turbine bypass valve (TBV) may allow exhaust gas to bypass the HP turbocharger, thereby reducing the restriction imposed by the HP turbocharger, but increasing the total amount of air charge provided to the intake manifold.

Engine control systems have been developed to control the TBV. Traditional engine control systems, however, do not control the TBV as accurately as desired. For example, an engine control system may determine a position of the TBV using a proportional-integral-derivative (PID) control scheme and a TBV position signal measured by a TBV position sensor. However, variations in the TBV position signal, exhaust pressure, PID control inaccuracies, and/or thermal deformation of the TBV may cause different leaks of the TBV at the closed position. The different leaks result in incorrect calculations and control of exhaust gas that flows through the turbochargers and of the output of the turbochargers, decreasing their efficiency.

SUMMARY

A control system comprising a current control module and a force control module. The current control module selectively supplies a current to a turbine bypass valve (TBV) to adjust the TBV to a predetermined position. The force control module selectively adjusts the current in response to a determination that an actual TBV position is less than a predetermined distance from the predetermined position.

In other features, the predetermined position is one of a predetermined fully open position and a predetermined fully closed position.

In still other features, the force control module selectively increases the current in response to the determination when the predetermined position is the predetermined fully closed position.

In further features, the force control module increases the current starting a predetermined delay period after the determination.

In still further features, the current control module decreases the current after the increase when a desired TBV position is less than a second predetermined position that is less closed than the predetermined position.

In other features, the current control module decreases the current after the increase when the actual TBV position is less than a second predetermined position that is less closed than the predetermined position.

In still other features, the force control module decreases the current in response to the determination when the predetermined position is the predetermined fully open position.

In further features, the force control module decreases the current starting a predetermined delay period after the determination.

In still further features, the current control module increases the current after the decrease when a desired TBV position is greater than a second predetermined position that is less open than the predetermined position.

In other features, the current control module increases the current after the decrease when the actual TBV position is greater than a second predetermined position that is less open than the predetermined position.

A control method comprises selectively supplying a current to a turbine bypass valve (TBV) to adjust the TBV to a predetermined position and selectively adjusting the current in response to a determination that an actual TBV position is less than a predetermined distance from the predetermined position.

In other features, the predetermined position is one of a predetermined fully open position and a predetermined fully closed position.

In still other features, the control method further comprises selectively increasing the current in response to the determination when the predetermined position is the predetermined fully closed position.

In further features, the control method further comprises increasing the current starting a predetermined delay period after the determination.

In still further features, the control method further comprises decreasing the current after the increasing the current when a desired TBV position is less than a second predetermined position that is less closed than the predetermined position.

In other features, the control method further comprises decreasing the current after the increasing the current when the actual TBV position is less than a second predetermined position that is less closed than the predetermined position.

In still other features, the control method further comprises decreasing the current in response to the determination when the predetermined position is the predetermined fully open position.

In further features, the control method further comprises decreasing the current starting a predetermined delay period after the determination.

In still further features, the control method further comprises increasing the current after the decreasing the current when a desired TBV position is greater than a second predetermined position that is less open than the predetermined position.

In other features, the control method further comprises increasing the current after the decreasing the current when the actual TBV position is greater than a second predetermined position that is less open than the predetermined position.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
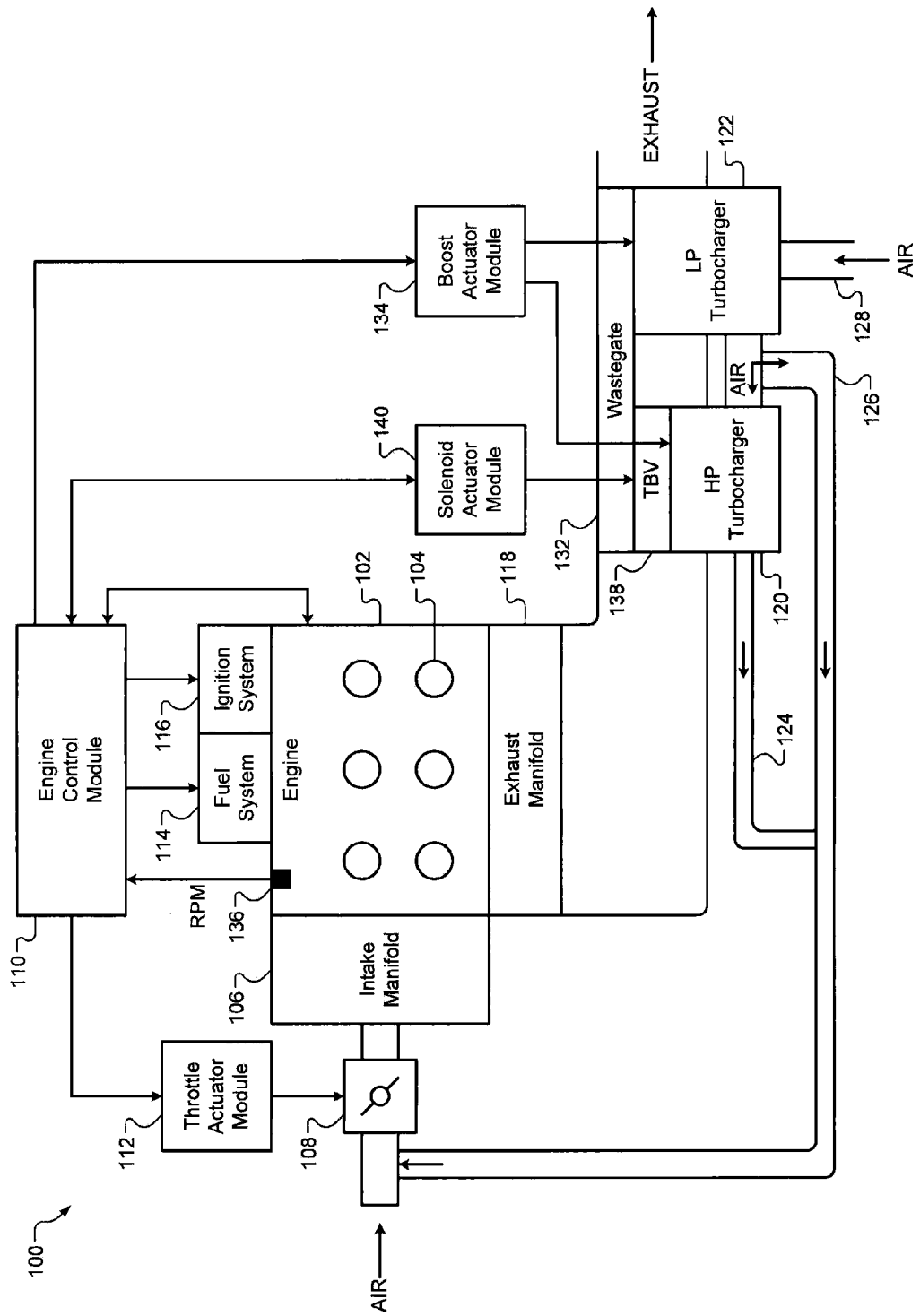
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

To accurately control a turbine bypass valve (TBV) of an engine system, the engine control system of the present disclosure includes a force control module. The force control module determines whether the engine control system is to be set to a force close mode, set to a force open mode, or reset from the force close mode or the force open mode based on a desired position and an actual position of the TBV. When the engine control system is set to the force close mode, the force control module accurately determines a force position that forces the TBV to be fully closed and disables a proportional-integral-derivative (PID) control scheme that typically determines the position of the TBV. When the engine control system is set to the force open mode, the force control module accurately determines the force position that forces the TBV to be fully open and disables the PID control scheme. When the engine control system is reset from the force close mode or the force open mode, the force control module determines the force position to be an initial position for the PID control scheme and quickly enables the PID control scheme.

Referring now to FIG. 1, a functional block diagram of an exemplary engine system 100 is shown. The engine system 100 includes an engine 102 that combusts an air/fuel mixture to produce drive torque for a vehicle. For example only, the engine 102 may include, but is not limited to, an internal combustion engine and/or a diesel engine. The engine 102 includes cylinders 104. For illustration purposes, six cylinders are shown. For example only, the engine 102 may include, but is not limited to, 2, 3, 4, 5, 6, 8, 10, and/or 12 cylinders.

The engine system 100 further includes an intake manifold 106, a throttle valve 108, an engine control module 110, a throttle actuator module 112, a fuel system 114, an ignition system 116, and an exhaust manifold 118. The engine system 100 further includes a high-pressure (HP) turbocharger 120, a low-pressure (LP) turbocharger 122, an outlet 124, an outlet 126, an inlet 128, a wastegate 132, a boost actuator module 134, and an engine speed (RPM) sensor 136. The engine system 100 further includes an TBV 138 and a solenoid actuator module 140.

Air is drawn into the intake manifold 106 through the throttle valve 108. The engine control module 110 commands the throttle actuator module 112 to regulate opening of the throttle valve 108 to control the amount of air drawn into the intake manifold 106. Air from the intake manifold 106 is drawn into the cylinders 104.

The engine control module 110 controls the amount of fuel injected by the fuel system 114. The fuel system 114 may inject fuel into the intake manifold 106 at a central location or may inject fuel into the intake manifold 106 at multiple locations. Alternatively, the fuel system 114 may inject fuel directly into the cylinders 104.

The injected fuel mixes with the air and creates the air/fuel mixture in the cylinders 104. Pistons (not shown) within the cylinders 104 compress the air/fuel mixture. Based upon a signal from the engine control module 110, the ignition system 116 ignites the air/fuel mixture. In various engine systems, the air/fuel mixture may be ignited by heat produced by compression.

The combustion of the air/fuel mixture drives the pistons down, thereby driving a crankshaft (not shown). The pistons then begin moving up again and expel the byproducts of combustion through the exhaust manifold 118. The byproducts of combustion are exhausted from the vehicle via the exhaust manifold 118.

The HP turbocharger 120 and the LP turbocharger 122 are powered by exhaust gases flowing through the exhaust manifold 118 and provide an HP compressed air charge and an LP compressed air charge, respectively, to the intake manifold 106. The HP compressed air charge and the LP compressed air charge are provided to the intake manifold 106 through the outlets 124 and 126, respectively. The LP turbocharger 122 may also supply air for compression to the HP turbocharger 120 via the outlet 126. The total compressed air charge may be provided upstream of the throttle valve 108. The air used to produce the compressed air charges may be drawn in via the inlet 128.

The wastegate 132 may allow exhaust gas to bypass the LP turbocharger 122 and/or the HP turbocharger 120, thereby reducing the output (i.e., boost) of the LP turbocharger 122 and/or the HP turbocharger 120. The engine control module 110 controls the LP turbocharger 122 and/or the HP turbocharger 120 via the boost actuator module 134. The boost actuator module 134 may modulate the boost of the LP turbocharger 122 and/or the HP turbocharger 120 by controlling, for example, the position of the wastegate 132 and/or the turbocharger positions. For example only, the boost actuator module 134 may control vane or nozzle position of the turbochargers 120 and 122 when the LP turbocharger 122 and/or the HP turbocharger 120 is a variable geometry turbocharger (VGT) or a variable nozzle turbocharger (VNT), respectively.

The engine control module 110 regulates operation of the engine system 100 based on various engine operating parameters. For example, the engine control module 110 controls and communicates with the engine 102. The control module 110 further communicates with the RPM sensor 136 that generates an RPM signal based on a speed of the engine 102. The RPM sensor 136 may be located within the engine 102 or at other locations, such as on the crankshaft (not shown).

The TBV 138 may allow exhaust gas to bypass the HP turbocharger 120, thereby reducing the boost of the HP turbocharger 120. The TBV 138 includes a solenoid valve that is controlled by running or stopping an electrical current through a solenoid, thus opening or closing the solenoid valve. The engine control module 110 commands the solenoid actuator module 140 to regulate opening of the TBV 138 to control the amount of exhaust gas released to the HP turbocharger 120. In addition, the solenoid actuator module 140 may measure the position of the TBV 138 and output a signal based on the position to the engine control module 110. The engine control module 110 determines the commands to the solenoid actuator module 140 as described herein.

Figure 2:
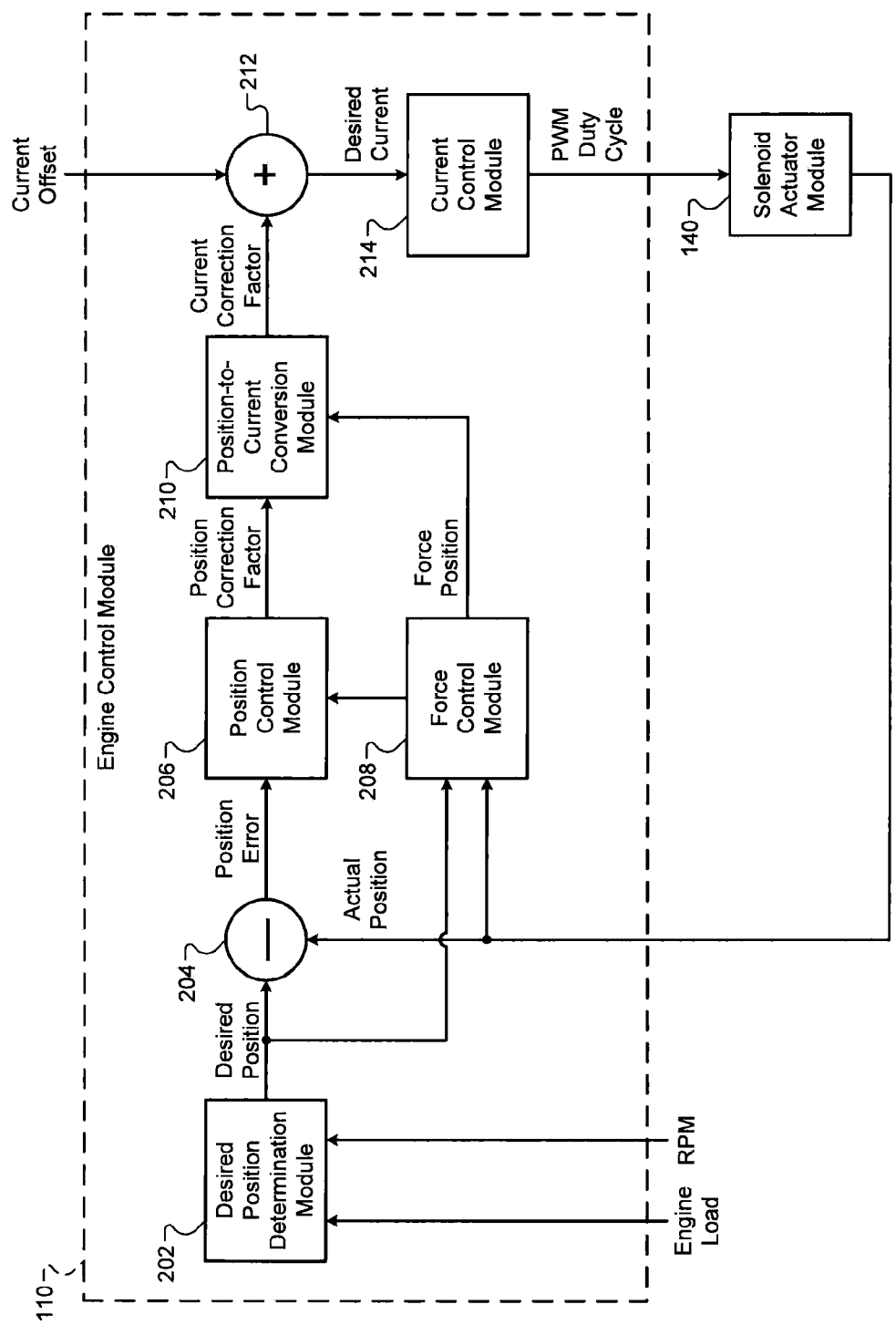
FIG. 2 is a functional block diagram of an exemplary engine control module according to the principles of the present disclosure.

Referring now to FIG. 2, a functional block diagram of the engine control module 110 is shown. The engine control module 110 includes a desired position determination module 202, a subtraction module 204, a position control module 206, a force control module 208, a position-to-current conversion module 210, a summation module 212, and a current control module 214. The desired position determination module 202 receives data on engine operating conditions from sensors of the engine system 100. For example only, the engine operating conditions may include, but are not limited to, an engine load, the RPM, an actual pressure within the intake manifold 106 (not shown), and/or a desired pressure within the intake manifold 106 to be reached by the turbochargers 120 and 122 (not shown). The desired position determination module 202 determines a desired position of the TBV 138 based on models that relate the desired position to the engine operating conditions. For example only, a position of the TBV 138 may be in units of percentage and may include a predetermined range of values from −100% (e.g., fully open) to 100% (e.g., fully closed).

The subtraction module 204 receives the desired position and an actual position of the TBV 138 from the solenoid actuator module 140. The subtraction module 204 subtracts the actual position from the desired position to determine a position error. The position control module 206 receives the position error and determines a position correction factor based on the position error. The position control module 206 uses a proportional-integral-derivative (PID) control scheme to determine the position correction factor.

The force control module 208 receives the desired position and the actual position. The force control module 208 determines whether the engine control module 110 is to be set to a force close mode, set to a force open mode, or reset to a position control mode based on the desired and the actual positions. When the engine control module 110 is set to the force close mode, the force control module 208 forces the TBV 138 to fully close by determining a force position based on the actual position and disabling the position control module 206. When the engine control module 110 is set to the force open mode, the force control module 208 forces the TBV 138 to fully open by determining the force position based on the actual position and disabling the position control module 206. When the engine control module 110 is reset to the position control mode, the force control module 208 initializes the position control module 206 by determining the force position based on predetermined initial positions and enabling the position control module 206 to control the position of the TBV 138.

The position-to-current conversion module 210 receives the position correction factor and the force position. When the position-to-current conversion module 210 receives the force position, the position-to-current conversion module 210 converts the force position to a current correction factor based on a model that relates a position to the current correction factor. Otherwise, the position-to-current conversion module 210 converts the position correction factor to the current correction factor based on the model. For example only, a current through the solenoid of the TBV 138 may be in units of amperes (A) and may include a predetermined range of values from 0 A to 1 A. For example only, when a position of the TBV 138 is equal to zero, a current through the solenoid of the TBV 138 may be equal to 0.5 A.

The summation module 212 receives the current correction factor and a current offset from data memory (not shown). The current offset is the amount of current when the TBV 138 is at a null position (i.e., an initial position) and is determined based on the type of the solenoid at engine startup. The summation module 212 sums the current correction factor and the current offset to determine a desired current through the solenoid of the TBV 138.

The current control module 214 receives a battery voltage from a battery (not shown) that creates the electrical current for the solenoid and the desired current. The current control module 214 determines (i.e., predicts) a pulse-width modulation of a duty cycle of the desired current (i.e., a PWM duty cycle). The current control module 214 determines the PWM duty cycle further based on the battery voltage. The solenoid actuator module 140 receives the PWM duty cycle and regulates opening of the TBV 138 based on the PWM duty cycle.

Figure 3:
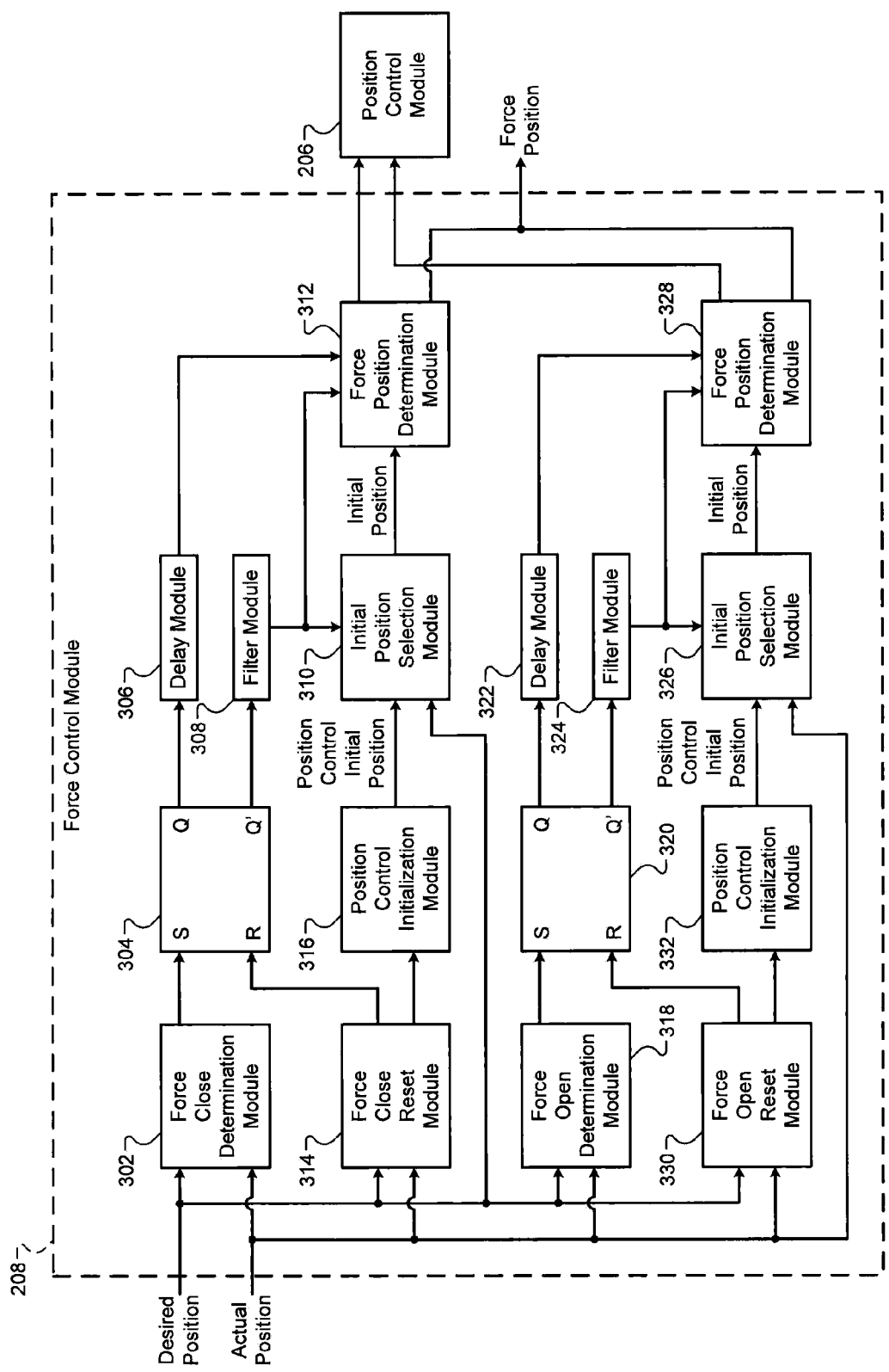
FIG. 3 is a functional block diagram of an exemplary force control module according to the principles of the present disclosure.

Referring now to FIG. 3, a functional block diagram of the force control module 208 is shown. The force control module 208 includes a force close determination module 302, an SR latch 304, a delay module 306, a filter module 308, an initial position selection module 310, a force position determination module 312, a force close reset module 314, and a position control initialization module 316. The force control module 208 further includes a force open determination module 318, an SR latch 320, a delay module 322, a filter module 324, an initial position selection module 326, a force position determination module 328, a force open reset module 330, and a position control initialization module 332.

The force close determination module 302 receives the desired position and the actual position and determines whether the engine control module 110 is to be set to the force close mode. When the desired position is greater than or equal to a first predetermined position (e.g., 99.9%) and the actual position is greater than a second predetermined position (e.g., 99.5%), the engine control module 110 is determined to be set to the force close mode. The force close determination module 302 sets a set input (i.e., an S) of the SR latch 304 to high. If a reset input (i.e., an R) of the SR latch 304 is low, the SR latch 304 sets an Q output (i.e., an Q) to high and holds an Q' output (i.e., an Q'), or the complement of Q, at low.

When the Q output is initially set to high, the delay module 306 receives and delays the Q output for a predetermined time period (e.g., greater than 0.5 seconds). The Q output is delayed to account for TBV response delay and noise in the actual position signal from the solenoid actuator module 140. This assures that the actual position is stable and that the determination to set the engine control module 110 to the force close mode is accurate.

The filter module 308 receives and outputs the Q' output to the initial position selection module 310. The initial position selection module 310 further receives the actual position. When the Q' output is low, the initial position selection module 310 determines an initial position for the TBV 138 based on the actual position.

When the force position determination module 312 receives the delayed Q output that is high, the force position determination module 312 receives the initial position and sets the engine control module 110 to the force close mode. The force position determination module 312 determines the force position based on the initial position and ramps the force position to a predetermined closed holding position (e.g., 40%). The closed holding position corresponds to a position required to fully close the TBV 138 and that is independent of closed position offsets that may be erroneous and/or too excessive in value (i.e., damaging to the TBV 138).

The force position is ramped based on a predetermined positive rate (e.g., 200%/second) or a predetermined negative rate (e.g., −200%/second). The force position is ramped to ensure a smooth transition to the closed holding position. The force position determination module 312 disables the position control module 206 (i.e., sets a proportional gain and a derivative gain of the position control module 206 to zero).

The force close reset module 314 receives the desired position and the actual position and determines whether the engine control module 110 is to be reset from the force close mode (i.e., set back to the position control mode). When the desired position is less than a third predetermined position (e.g., 99.8%) or the actual position is less than or equal to a fourth predetermined position (e.g., 99%), the engine control module 110 is determined to be reset from the force close mode. The force close reset module 314 sets the reset input to high, and if the set input is low, the SR latch 304 sets the Q output to low and sets the Q' output to high.

The force close reset module 314 outputs a signal that indicates whether the desired position is less than the third predetermined position. The position control initialization module 316 receives the signal and determines an initial position for the position control mode (i.e., a position control initial position) based on the signal. When the signal indicates that the desired position is less than the third predetermined position, the position control initialization module 316 determines the position control initial position based on a fifth predetermined position. The fifth predetermined position is less than or equal to a predetermined null position (i.e., a maximum initial position for the position control mode) to open the TBV 138 (e.g., 0%).

When the signal indicates that the desired position is greater than or equal to the third predetermined position, the position control initial position is determined based on a sixth predetermined position that is greater than or equal to the closed holding position. The sixth predetermined position may be greater than the closed holding position because when the desired position is greater than or equal the third predetermined position but the actual position is less than or equal to the fourth predetermined position, the closed holding position is not enough to hold the TBV 138 closed. For example only, exhaust pressure may be pushing the TBV 138 open.

When the Q output is set to low, the delay module 306 receives and outputs the Q output to the force position determination module 312. When the Q' output is initially set to high, the filter module 308 receives and filters the Q' output into a pulse of a predetermined time period. The initial position selection module 310 receives the filtered Q' output and the position control initial position. When the filtered Q' output is high, the initial position selection module 310 determines the initial position based on the position control initial position.

When the force position determination module 312 receives the filtered Q' output that is high, the force position determination module 312 receives the initial position and determines the force position based on the initial position. When the filtered Q' output returns to low and the Q output is low, the force position determination module 312 sets the engine control module 110 to the position control mode. The force position determination module 312 enables the position control module 206 (i.e., sets the proportional and the derivative gains to predetermined initial values).

The force open determination module 318 receives the desired position and the actual position and determines whether the engine control module 110 is to be set to the force open mode. When the desired position is less than or equal to a seventh predetermined position (e.g., −99.9%) and the actual position is less than an eighth predetermined position (e.g., −99.5%), the engine control module 110 is determined to be set to the force open mode. The force open determination module 318 sets a set input (i.e., an S) of the SR latch 320 to high. If a reset input (i.e., an R) of the SR latch 320 is low, the SR latch 320 sets an Q output (i.e., an Q) to high and holds an Q' output (i.e., an Q'), or the complement of Q, at low.

When the Q output is initially set to high, the delay module 322 receives and delays the Q output for a predetermined time period (e.g., greater than 0.5 seconds). This assures that the actual position is stable and that the determination to set the engine control module 110 to the force open mode is accurate. The filter module 324 receives and outputs the Q' output to the initial position selection module 326. The initial position selection module 326 further receives the actual position. When the Q' output is low, the initial position selection module 326 determines an initial position for the TBV 138 based on the actual position.

When the force position determination module 328 receives the delayed Q output that is high, the force position determination module 328 receives the initial position and sets the engine control module 110 to the force open mode. The force position determination module 328 determines the force position based on the initial position and ramps the force position to a predetermined open holding position (e.g., −40%). The open holding position corresponds to a position required to fully open the TBV 138 and that is independent of open position offsets. The force position is ramped based on a predetermined positive rate (e.g., 200%/second) or a predetermined negative rate (e.g., −200%/second). The force position determination module 328 disables the position control module 206.

The force close reset module 330 receives the desired position and the actual position and determines whether the engine control module 110 is to be reset from the force open mode (i.e., set back to the position control mode). When the desired position is greater than a ninth predetermined position (e.g., −99.8%) or the actual position is greater than or equal to a tenth predetermined position (e.g., −99%), the engine control module 110 is determined to be reset from the force open mode. The force close reset module 330 sets the reset input to high, and if the set input is low, the SR latch 332 sets the Q output to low and sets the Q' output to high.

The force close reset module 330 outputs a signal that indicates whether the desired position is greater than the ninth predetermined position. The position control initialization module 332 receives the signal and determines an initial position for the position control mode (i.e., a position control initial position) based on the signal. When the signal indicates that the desired position is greater than the ninth predetermined position, the position control initialization module 332 determines the position control initial position based on an eleventh predetermined position. The eleventh predetermined position is greater than or equal to the null position to close the TBV 138.

When the signal indicates that the desired position is less than or equal to the ninth predetermined position, the position control initial position is determined based on a twelfth predetermined position that is less than or equal to the open holding position. The twelfth predetermined position may be less than the open holding position. When the desired position is less than or equal the ninth predetermined position but the actual position is greater than or equal to the tenth predetermined position, the open holding position is not enough to hold the TBV 138 open.

When the Q output is set to low, the delay module 322 receives and outputs the Q output to the force position determination module 328. When the Q' output is initially set to high, the filter module 324 receives and filters the Q' output into a pulse of a predetermined time period. The initial position selection module 326 receives the filtered Q' output and the position control initial position. When the filtered Q' output is high, the initial position selection module 326 determines the initial position based on the position control initial position.

When the force position determination module 328 receives the filtered Q' output that is high, the force position determination module 328 receives the initial position and determines the force position based on the initial position. When the filtered Q' output returns to low and the Q output is low, the force position determination module 328 sets the engine control module 110 to the position control mode. The force position determination module 328 enables the position control module 206.

Figure 4A:
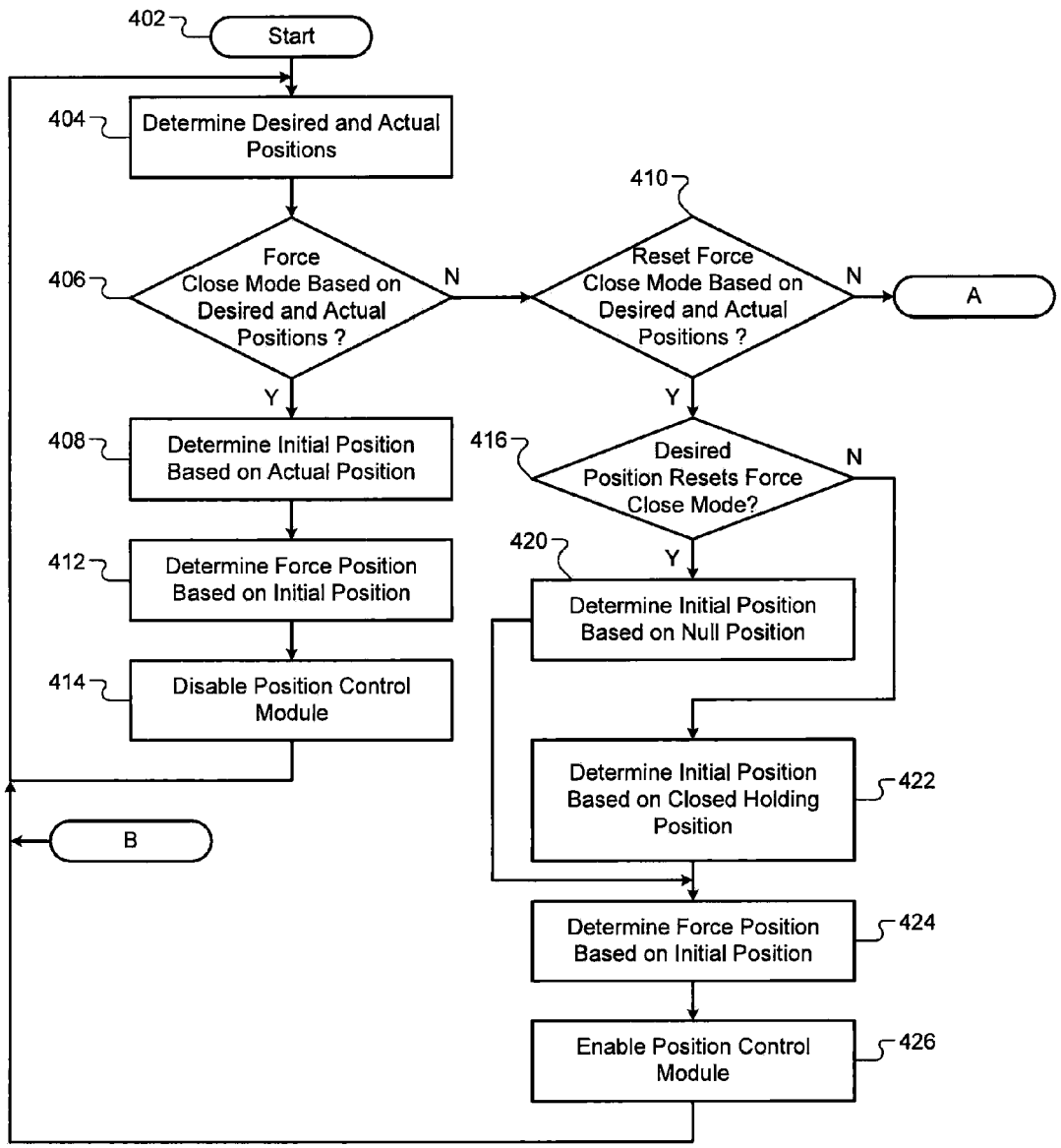
FIG. 4A is a flowchart depicting exemplary steps of an engine control method according to the principles of the present disclosure.
Figure 4B:
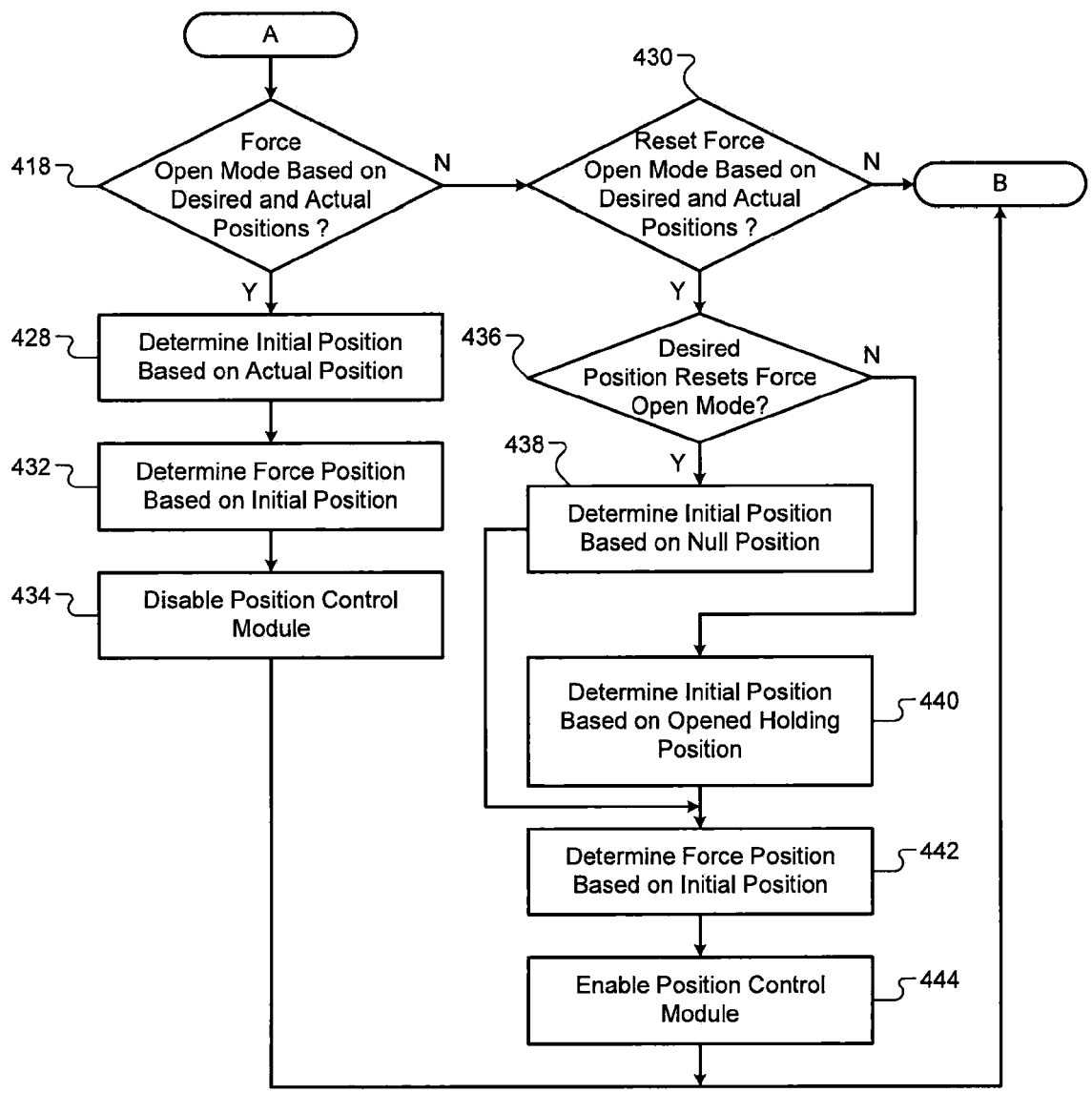
FIG. 4B is a portion of the flowchart of FIG. 4A.

Referring now to FIGS. 4A and 4B, a flowchart depicting exemplary steps of an engine control method is shown. Control begins in step 402. In step 404, the desired and the actual positions are determined. In step 406, control determines whether the engine control module 110 is to be set to the force close mode based on the desired and the actual positions. If true, control continues in step 408. If false, control continues in step 410.

In step 408, the initial position is determined based on the actual position. In step 412, the force position is determined based on the initial position. In step 414, the position control module 206 is disabled. Control returns to step 404.

In step 410, control determines whether the engine control module 110 is to be reset from the force close mode based on the desired and the actual positions. If true, control continues in step 416. If false, control continues in step 418.

In step 416, control determines whether the desired position caused the force close mode to be reset. If true, control continues in step 420. If false, control continues in step 422. In step 420, the initial position is determined based on the null position.

In step 422, the initial position is determined based on the closed holding position. In step 424, the force position is determined based on the initial position. In step 426, the position control module 206 is enabled. Control returns to step 404.

In step 418, control determines whether the engine control module 110 is to be set to the force open mode based on the desired and the actual positions. If true, control continues in step 428. If false, control continues in step 430.

In step 428, the initial position is determined based on the actual position. In step 432, the force position is determined based on the initial position. In step 434, the position control module 206 is disabled. Control returns to step 404.

In step 430, control determines whether the engine control module 110 is to be reset from the force open mode based on the desired and the actual positions. If true, control continues in step 436. If false, control returns to step 404.

In step 436, control determines whether the desired position caused the force open mode to be reset. If true, control continues in step 438. If false, control continues in step 440. In step 438, the initial position is determined based on the null position.

In step 440, the initial position is determined based on the open holding position. In step 442, the force position is determined based on the initial position. In step 444, the position control module 206 is enabled. Control returns to step 404.

Figure 5:
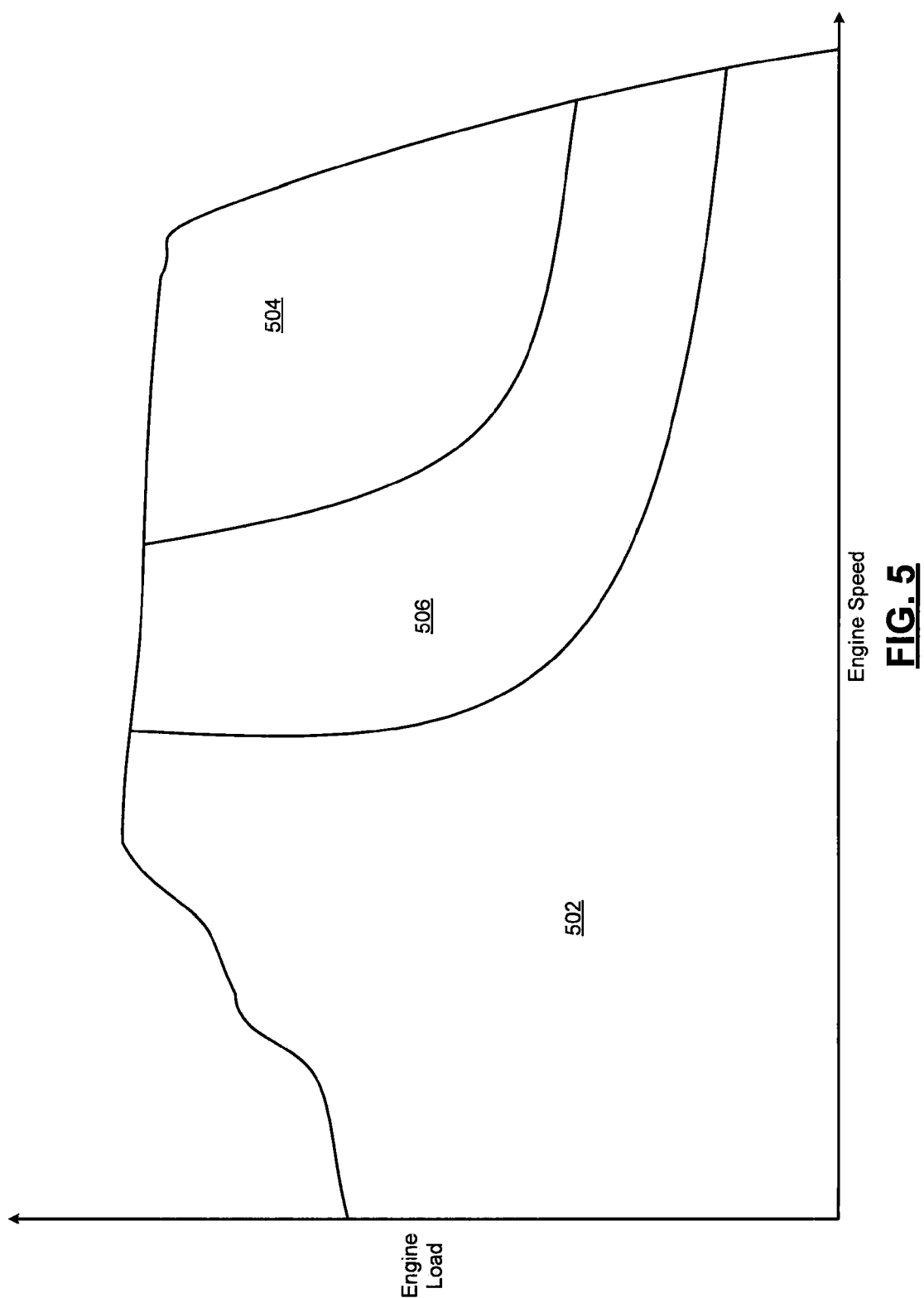
FIG. 5 is a graph depicting three operating modes of the engine control module that are predetermined based on an engine load and an engine speed according to the principles of the present disclosure.

Referring now to FIG. 5, a graph depicting three operating modes of the engine control module 110 that are predetermined based on the engine load and the RPM is shown. The operating modes include a force close mode 502, a force open mode 504, and a position control mode 506. When the engine load and the RPM are low in value, the engine control module 110 determines a desired position of the TBV 138 (not shown) that results in the engine control module 110 operating in the force close mode 502. When the engine load and the RPM are high in value, the desired position is determined that results in the engine control module 110 operating in the force open mode 504. When the engine load and the RPM are within a range of values, the desired position is determined that results in the engine control module 110 operating the position control mode.

Figure 6:
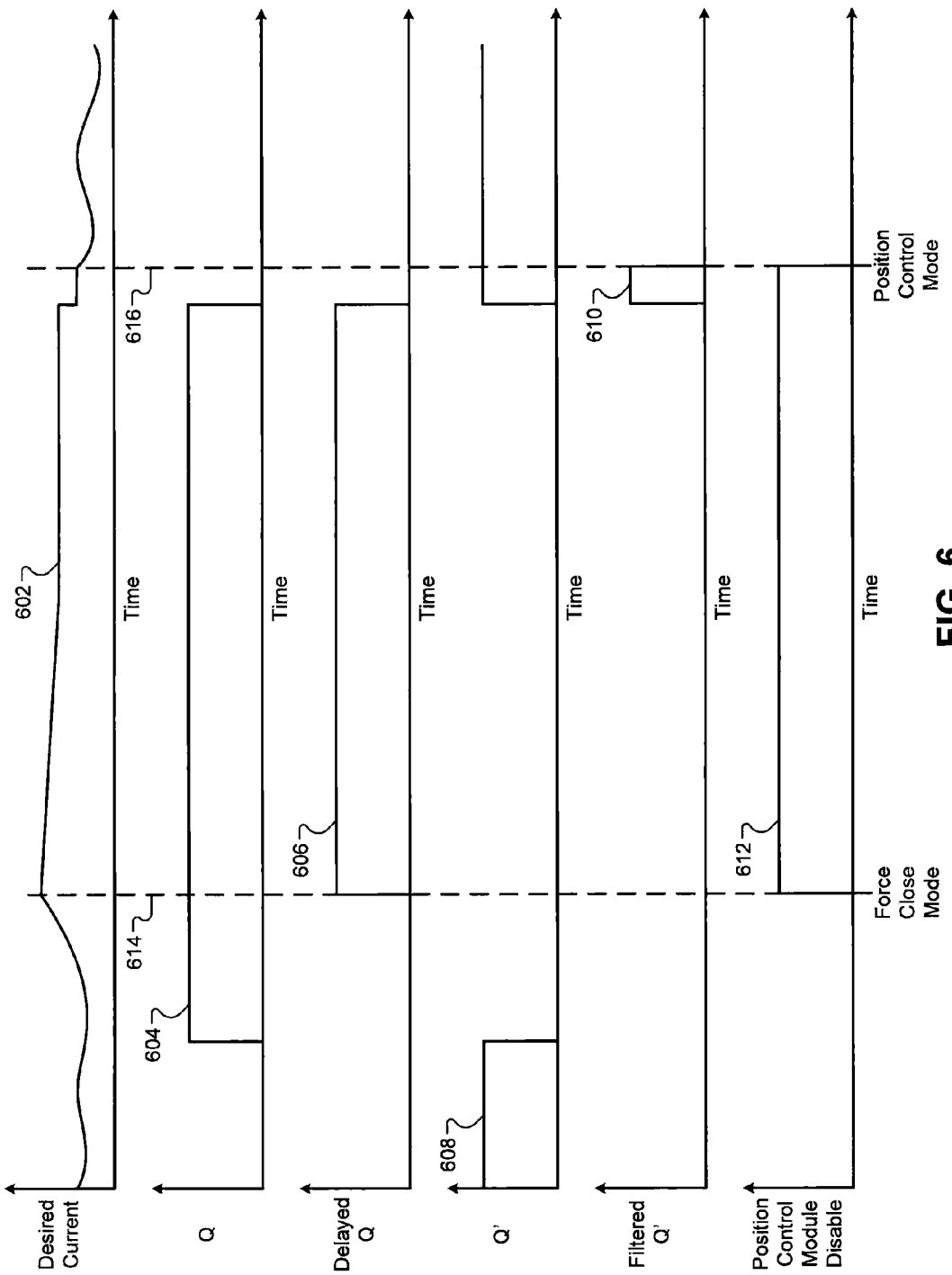
FIG. 6 is a graph depicting a time versus a desired current, an Q output, a delayed Q output, an Q' output, a filtered Q' output, and a position control module disable signal of the engine control module according to the principles of the present disclosure.

Referring now to FIG. 6, a graph depicting a time versus a desired current 602, an Q output 604, a delayed Q output (i.e., a delayed Q) 606, an Q' output 608, a filtered Q' output (i.e., a filtered Q') 610, and a position control module disable signal (i.e., position control module disable) 612 of the engine control module 110 is shown. When the Q output 604 is set to high, the Q' output 608 is set to low. When the delayed Q output 606 is set to high, engine control module 110 is set to the force close mode 614. The desired current 602 is initialized to an actual current and ramped down to a holding current. The position control module disable signal 612 is set to high, which indicates that the position control module 206 is disabled.

When the Q output 604 is reset to low, the Q' output 608 is reset to high. The filtered Q' 610 is set to high and is a pulse of a predetermined time period. The desired current 602 is set to a null current. When the filtered Q' falls to low, the position control module 206 is enabled and the desired current 602 is controlled by the position control module 206.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system comprising:
a current control module that selectively supplies a current to a turbine bypass valve (TBV) to adjust said TBV to a predetermined position; and
a force control module that starts selectively adjusting said current a predetermined delay period after a determination that an actual TBV position is less than a predetermined distance from said predetermined position,
wherein said predetermined delay period is greater than or equal to 0.5 seconds.

2. The control system of claim 1 wherein said predetermined position is one of a predetermined fully open position and a predetermined fully closed position.

3. The control system of claim 2 wherein said force control module selectively increases said current in response to said determination when said predetermined position is said predetermined fully closed position.

4. The control system of claim 3 wherein said current control module decreases said current after said increase when a desired TBV position is less than a second predetermined position that is less closed than said predetermined position.

5. The control system of claim 3 wherein said current control module decreases said current after said increase when said actual TBV position is less than a second predetermined position that is less closed than said predetermined position.

6. The control system of claim 2 wherein force control module decreases said current in response to said determination when said predetermined position is said predetermined fully open position.

7. The control system of claim 6 wherein said current control module increases said current after said decrease when a desired TBV position is greater than a second predetermined position that is less open than said predetermined position.

8. The control system of claim 6 wherein said current control module increases said current after said decrease when said actual TBV position is greater than a second predetermined position that is less open than said predetermined position.

9. A control method comprising:
selectively supplying a current to a turbine bypass valve (TBV) to adjust said TBV to a predetermined position; and
starting to selectively adjust said current a predetermined delay period after a determination that an actual TBV position is less than a predetermined distance from said predetermined position,
wherein said predetermined delay period is greater than or equal to 0.5 seconds.

10. The control method of claim 9 wherein said predetermined position is one of a predetermined fully open position and a predetermined fully closed position.

11. The control method of claim 10 further comprising selectively increasing said current in response to said determination when said predetermined position is said predetermined fully closed position.

12. The control method of claim 11 further comprising decreasing said current after said increasing said current when a desired TBV position is less than a second predetermined position that is less closed than said predetermined position.

13. The control method of claim 11 further comprising decreasing said current after said increasing said current when said actual TBV position is less than a second predetermined position that is less closed than said predetermined position.

14. The control method of claim 10 further comprising decreasing said current in response to said determination when said predetermined position is said predetermined fully open position.

15. The control method of claim 14 further comprising increasing said current after said decreasing said current when a desired TBV position is greater than a second predetermined position that is less open than said predetermined position.

16. The control method of claim 14 further comprising increasing said current after said decreasing said current when said actual TBV position is greater than a second predetermined position that is less open than said predetermined position.

* * * * *